United States Patent
Kanno et al.

(10) Patent No.: US 10,790,532 B2
(45) Date of Patent: Sep. 29, 2020

(54) FUEL CELL STACK AND DUMMY CELL

(71) Applicants: TOYOTA JIDOSHA KABUSHIKI KAISHA, Toyota-shi, Aichi-ken (JP); TOYOTA SHATAI KABUSHIKI KAISHA, Kariya-shi, Aichi-ken (JP)

(72) Inventors: Daisuke Kanno, Nagoya (JP); Takenori Yamasaki, Nisshin (JP); Atsushi Ida, Nisshin (JP); Daisuke Hayashi, Nisshin (JP); Shuji Kurita, Toyota (JP); Takashi Kondo, Nagoya (JP); Keiji Hashimoto, Nagakute (JP)

(73) Assignees: Toyota Jidosha Kabushiki Kaisha, Toyota-shi, Aichi-ken (JP); Toyota Shatai Kabushiki Kaisha, Kariya-shi, Aichi-ken (JP)

( * ) Notice: Subject to any disclaimer, the term of this patent is extended or adjusted under 35 U.S.C. 154(b) by 311 days.

(21) Appl. No.: 15/845,149

(22) Filed: Dec. 18, 2017

(65) Prior Publication Data

US 2018/0183087 A1    Jun. 28, 2018

(30) Foreign Application Priority Data

Dec. 28, 2016 (JP) ................. 2016-255020

(51) Int. Cl.
*H01M 8/0258* (2016.01)
*H01M 8/04119* (2016.01)
(Continued)

(52) U.S. Cl.
CPC ....... *H01M 8/2465* (2013.01); *H01M 8/0258* (2013.01); *H01M 8/04089* (2013.01); *H01M 8/2483* (2016.02); *H01M 8/04119* (2013.01)

(58) Field of Classification Search
None
See application file for complete search history.

(56) References Cited

U.S. PATENT DOCUMENTS

| 2009/0042075 A1 | 2/2009 | Nakanishi et al. |
| 2010/0068599 A1 | 3/2010 | Furusawa et al. |
| (Continued) | | |

FOREIGN PATENT DOCUMENTS

| CA | 2628763 A1 | 5/2007 |
| JP | 07-235314 A | 9/1995 |
| (Continued) | | |

OTHER PUBLICATIONS

U.S. Appl. No. 15/832,991, filed Dec. 6, 2017.

*Primary Examiner* — Jonathan Crepeau
(74) *Attorney, Agent, or Firm* — Finnegan, Henderson, Farabow, Garrett & Dunner, LLP

(57) ABSTRACT

A fuel cell stack includes: a plurality of power generation cells stacked on top of each other; a dummy cell provided on at least one of both ends of the plurality of power generation cells, the dummy cell being configured not to generate electric power; and a reaction gas supply manifold extending through the plurality of power generation cells and the dummy cell. The dummy cell includes one or more dummy cell reaction gas introduction channels as a reaction gas introduction channel that introduces reaction gas from the reaction gas supply manifold to a center area of the dummy cell. At least one of the dummy cell reaction gas introduction channels is provided so as to connect to a bottom face at a lower side of the reaction gas supply manifold in a direction of gravitational force.

6 Claims, 9 Drawing Sheets

(51) Int. Cl.
*H01M 8/2483* (2016.01)
*H01M 8/2465* (2016.01)
*H01M 8/04089* (2016.01)

(56) References Cited

U.S. PATENT DOCUMENTS

2015/0118587 A1 4/2015 Heo et al.
2016/0211543 A1 7/2016 Okabe et al.

FOREIGN PATENT DOCUMENTS

| | | |
|---|---|---|
| JP | 2005-259424 A | 9/2005 |
| JP | 2008-130350 | 6/2008 |
| JP | 2009-043493 A | 2/2009 |
| JP | 2010-073448 A | 4/2010 |
| JP | 2014-026821 A | 2/2014 |
| JP | 2015-69737 | 4/2015 |
| KR | 10-0700073 B1 | 3/2007 |
| KR | 10-2013-0081477 A | 7/2013 |

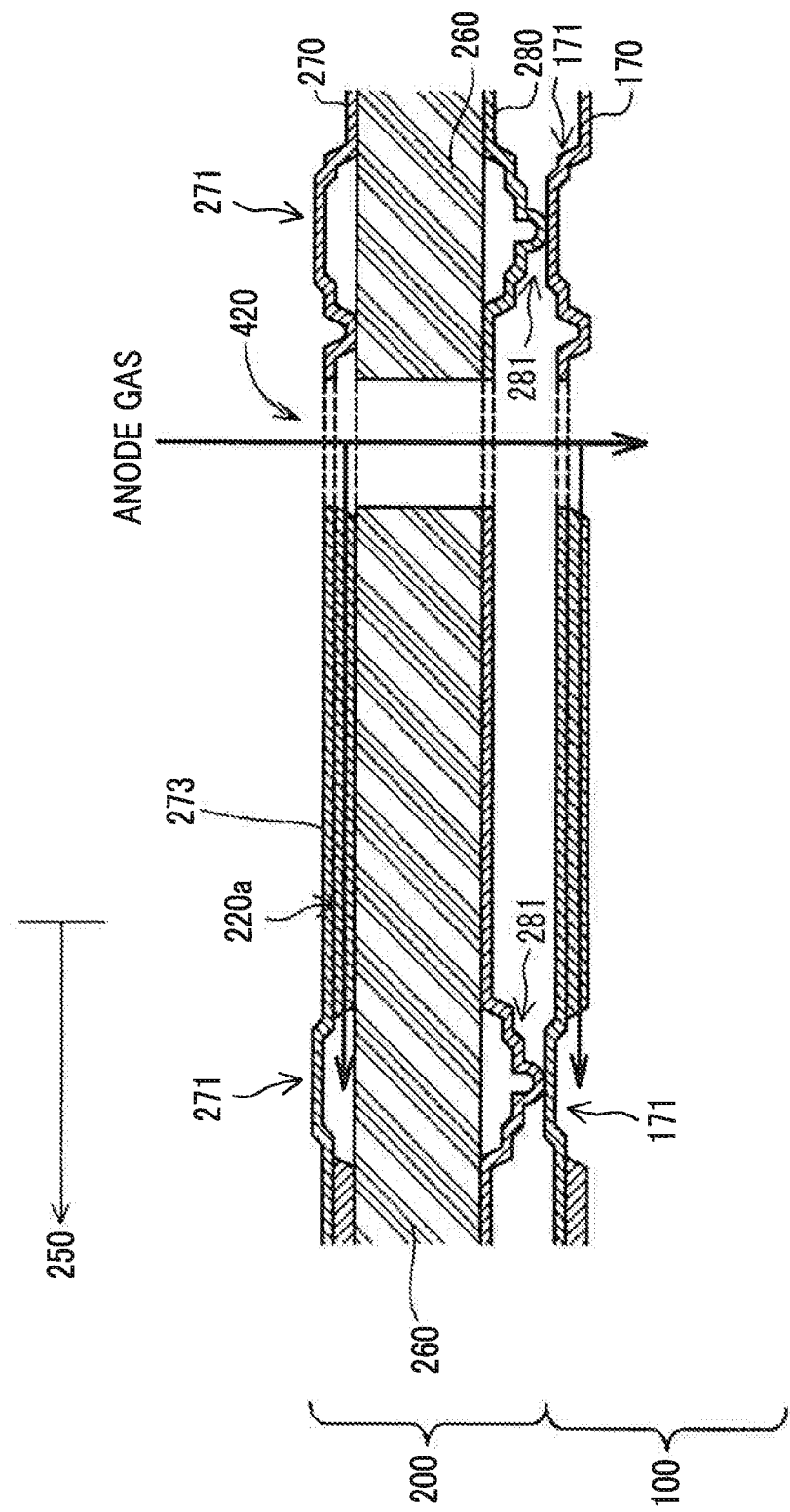

FUEL CELL STACK AND DUMMY CELL

INCORPORATION BY REFERENCE

The disclosure of Japanese Patent Application No. 2016-255020 filed on Dec. 28, 2016 including the specification, drawings and abstract is incorporated herein by reference in its entirety.

BACKGROUND

1. Technical Field

The disclosure relates to a fuel cell stack and a dummy cell.

2. Description of Related Art

For example, Japanese Patent Application Publication No. 2015-69737 (JP 2015-069737 A) describes a fuel cell stack. In the fuel cell stack, a plurality of power generation cells are stacked on top of each other, and dummy cells that do not generate electric power are respectively provided on both sides of the plurality of power generation cells in the stacking direction.

SUMMARY

When liquid water flows into a supply manifold for supplying reaction gas to a fuel cell, the liquid water flows at the lower side of the supply manifold in the direction of gravitational force. At this time, liquid water can intensively enter a specific one of the power generation cells beyond the dummy cell, so there is an inconvenience that reaction gas cannot be supplied and sufficient power generation is not performed in the specific power generation cell.

The disclosure is contemplated in order to solve at least part of the above-described inconvenience, and is able to implement the following aspects.

A first aspect of the disclosure provides a fuel cell stack. The fuel cell stack includes: a plurality of power generation cells stacked on top of each other; a dummy cell provided on at least one of both ends of the plurality of power generation cells, the dummy cell being configured not to generate electric power; and a reaction gas supply manifold extending through the plurality of power generation cells and the dummy cell. The dummy cell includes one or more dummy cell reaction gas introduction channels as a reaction gas introduction channel that introduces reaction gas from the reaction gas supply manifold to a center area of the dummy cell. At least one of the dummy cell reaction gas introduction channels is provided so as to connect to a bottom face at a lower side of the reaction gas supply manifold in a direction of gravitational force. As liquid water enters the reaction gas supply manifold, the liquid water flows along the bottom face at the lower side of the reaction gas supply manifold in the direction of gravitational force. According to this aspect, since at least one of the dummy cell reaction gas introduction channels is provided so as to connect to the bottom face at the lower side of the reaction gas supply manifold in the direction of gravitational force, liquid water is easy to move to the center area of the dummy cell, the amount of movement of liquid water to the power generation area of the power generation cell adjacent to the dummy cell reduces, so it is possible to suppress intensive entry of liquid water to the specific power generation cell.

In the above aspect, each power generation cell may include one or more power generation cell reaction gas introduction channels as a reaction gas introduction channel that introduces reaction gas from the reaction gas supply manifold to a power generation area of the power generation cell, and, in each of one or more of the power generation cells adjacent to the dummy cell, the power generation cell reaction gas introduction channel may not be provided so as to connect to the bottom face at the lower side of the reaction gas supply manifold in the direction of gravitational force but provided so as to connect to a side face above the bottom face in the direction of gravitational force. According to this aspect, even when liquid water flows to one or more power generation cells adjacent to the dummy cell, since the power generation cell reaction gas introduction channel is not provided so as to connect to the bottom face of the reaction gas supply manifold but provided so as to connect to the side face above the bottom face in the direction of gravitational force, it is possible to suppress entry of water to the power generation area of the power generation cell.

In the above aspect, the dummy cell may include a first resin frame, a first anode separator plate and a first cathode separator plate, the first resin frame may surround the center area of the dummy cell, the first anode separator plate and the first cathode separator plate may sandwich the first resin frame, each power generation cell may include a second resin frame, a second anode separator plate and a second cathode separator plate, the second resin frame may surround the power generation area of the power generation cell, and the second anode separator plate and the second cathode separator plate may sandwich the second resin frame, the shape of each of the first anode separator plate and the first cathode separator plate may be the same as the shape of each of the second anode separator plate and the second cathode separator plate, and the dummy cell reaction gas introduction channel may be provided with a groove of the first resin frame, and the power generation cell reaction gas introduction channel may be provided with a groove of the second resin frame. According to this aspect, since the dummy cell differs from each power generation cell in only the resin frame, the first anode separator plate and the first cathode separator plate are the same as the second anode separator plate and the second cathode separator plate.

A second aspect of the disclosure provides a dummy cell. The dummy cell is provided on at least one of both ends of a plurality of stacked power generation cells of a fuel cell stack, and is configured not to generate electric power. The dummy cell includes one or more dummy cell reaction gas introduction channels serving as a reaction gas introduction channel that introduces reaction gas from a reaction gas supply manifold to a center area of the dummy cell, the reaction gas supply manifold extending through the plurality of power generation cells and the dummy cell. At least one of the dummy cell reaction gas introduction channels is provided so as to connect to a bottom face at a lower side of the reaction gas supply manifold in a direction of gravitational force.

The disclosure may be implemented in various forms, and may be implemented in various forms, such as a fuel cell system, other than the fuel cell stack or the dummy cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a cross-sectional view taken along a dummy cell anode gas introduction channel of each dummy cell according to a first alternative embodiment.

DETAILED DESCRIPTION OF EMBODIMENTS

First Embodiment

Figure 1:
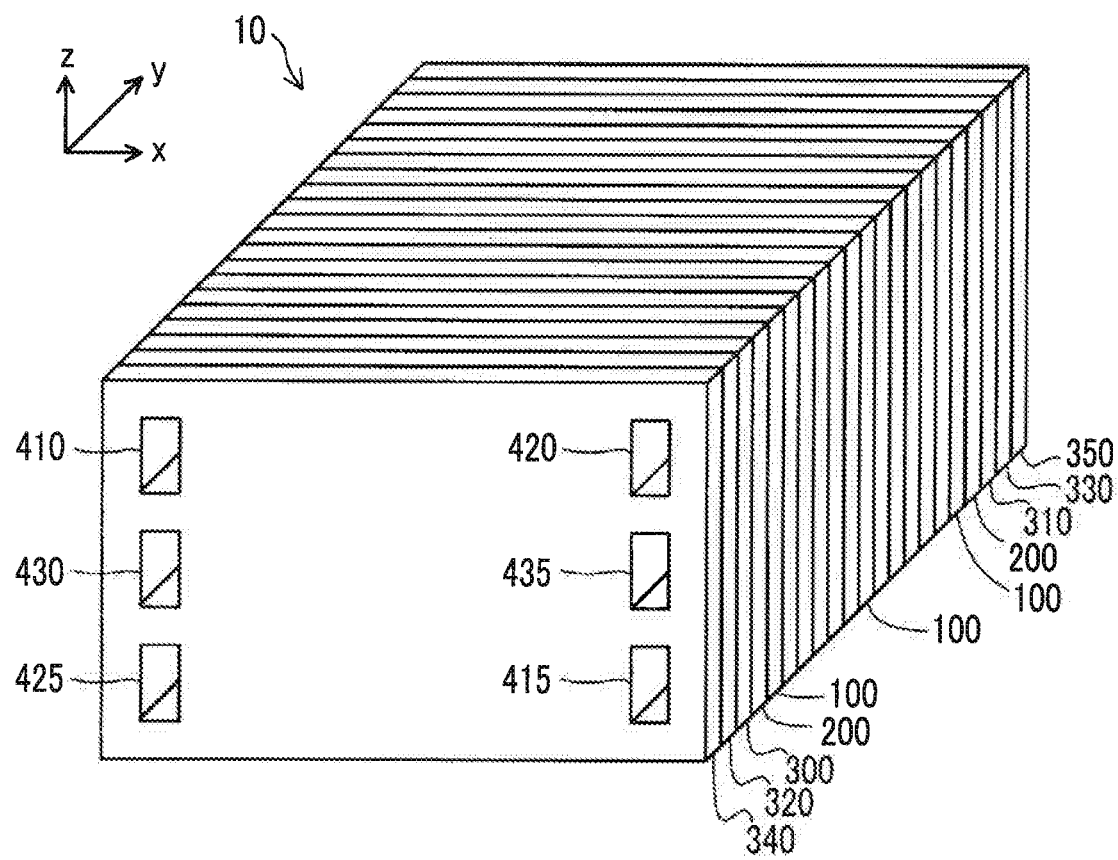
FIG. 1 is a perspective view of a fuel cell stack.

FIG. 1 is a perspective view of a fuel cell stack 10. The fuel cell stack 10 includes a plurality of power generation cells 100, dummy cells 200, current collectors 300, 310, electric insulating plates 320, 330, and end plates 340, 350. The plurality of power generation cells 100 is stacked on top of each other in a y direction to form a stack. In the first embodiment, the horizontal direction is indicated as x direction and y direction, and the vertical direction is indicated as z direction. The downward direction in the vertical direction is the direction of gravitational force. The dummy cells 200 are respectively arranged on both sides of the stack of the plurality of power generation cells 100 in the y direction so as to sandwich the plurality of power generation cells 100. The dummy cell 200 just needs to be provided on at least one of both ends of the plurality of power generation cells 100. The current collectors 300, 310 are respectively arranged on the outer sides of the dummy cells 200 in the y direction so as to sandwich the plurality of power generation cells 100 and the dummy cells 200. The electric insulating plates 320, 330 are respectively arranged on the outer sides of the current collectors 300, 310 in the y direction so as to sandwich the plurality of power generation cells 100, the dummy cells 200 and the current collectors 300, 310. The end plates 340, 350 are respectively arranged on the outer sides of the electric insulating plates 320, 330 in the y direction so as to sandwich the plurality of power generation cells 100, the dummy cells 200, the current collectors 300, 310 and the electric insulating plates 320, 330.

The fuel cell stack 10 includes a cathode gas supply manifold 410, a cathode gas discharge manifold 415, an anode gas supply manifold 420, an anode gas discharge manifold 425, a refrigerant supply manifold 430 and a refrigerant discharge manifold 435. The cathode gas supply manifold 410, the cathode gas discharge manifold 415, the anode gas supply manifold 420, the anode gas discharge manifold 425, the refrigerant supply manifold 430 and the refrigerant discharge manifold 435 extend through the plurality of power generation cells 100, the dummy cells 200, the current collectors 300, 310, the electric insulating plates 320, 330 and the end plates 340, 350. Manifolds for supplying reaction gas among the manifolds (which are also referred to as reaction gas supply manifolds; specifically, the cathode gas supply manifold 410 and the anode gas supply manifold 420) are provided at a higher position in the direction of gravitational force than manifolds for discharging reaction gas (which are also referred to as reaction gas discharge manifolds; specifically, the cathode gas discharge manifold 415 and the anode gas discharge manifold 425).

Figure 2:
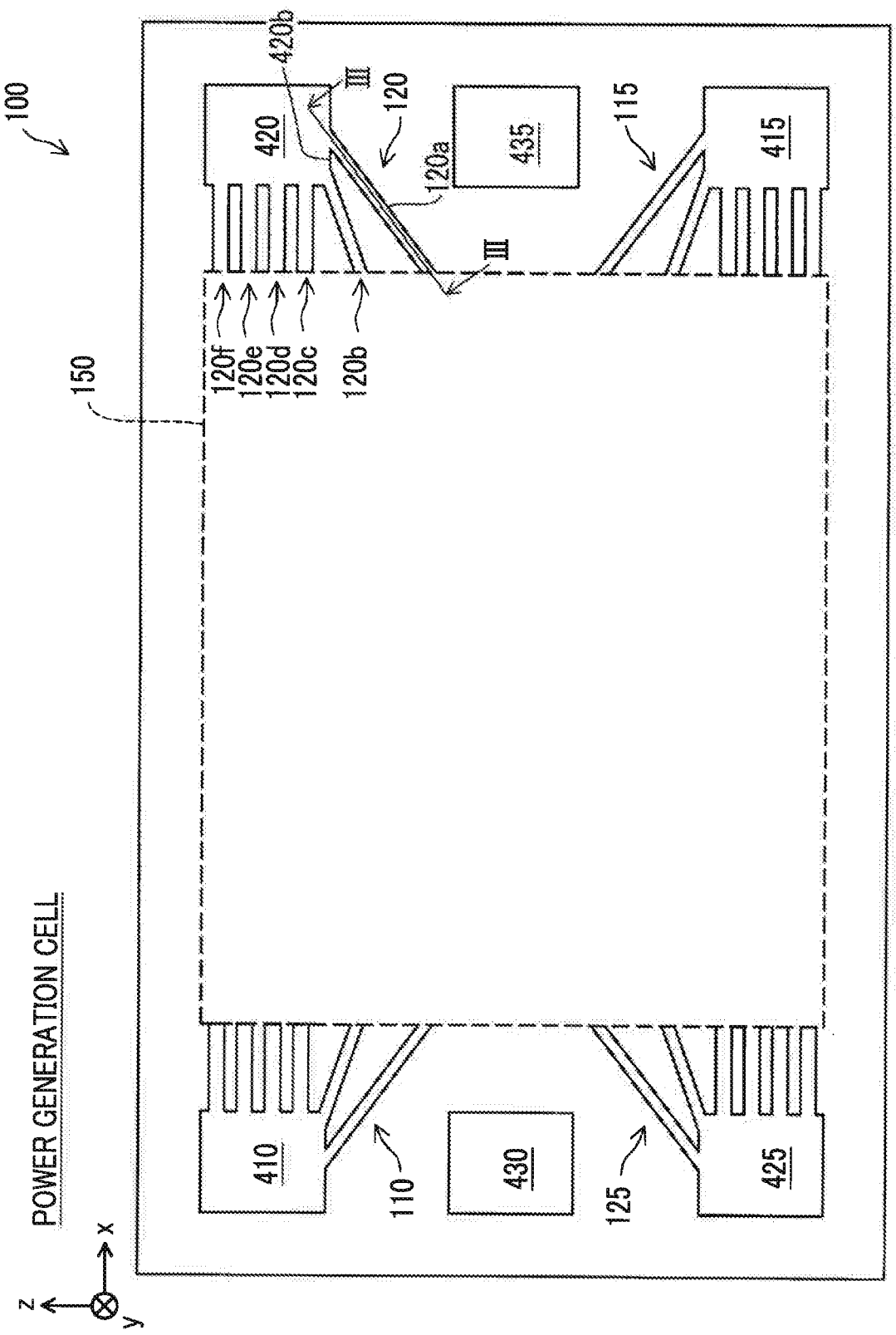
FIG. 2 is a plan view that schematically shows each power generation cell.

FIG. 2 is a plan view that schematically shows each power generation cell 100. A center area 150 of each power generation cell 100 is a power generation area. A membrane electrode assembly is provided in the center area 150. Each power generation cell 100 includes a power generation cell cathode gas introduction channel 110, a power generation cell cathode gas delivery channel 115, a power generation cell anode gas introduction channel 120 and a power generation cell anode gas delivery channel 125. The power generation cell cathode gas introduction channel 110 is used to introduce cathode gas from the cathode gas supply manifold 410 to the center area 150. The power generation cell cathode gas delivery channel 115 is used to deliver cathode gas from the center area 150 to the cathode gas discharge manifold 415. The power generation cell anode gas introduction channel 120 is used to introduce anode gas from the anode gas supply manifold 420 to the center area 150. The power generation cell anode gas delivery channel 125 is used to deliver anode gas from the center area 150 to the anode gas discharge manifold 425.

The power generation cell anode gas introduction channel 120 includes a plurality of power generation cell anode gas introduction channels 120a to 120f arranged along the direction of gravitational force. The power generation cell cathode gas introduction channel 110 also has a similar configuration. Each of the power generation cell anode gas delivery channel 125 and the power generation cell cathode gas delivery channel 115 also has a similar configuration.

Figure 3:
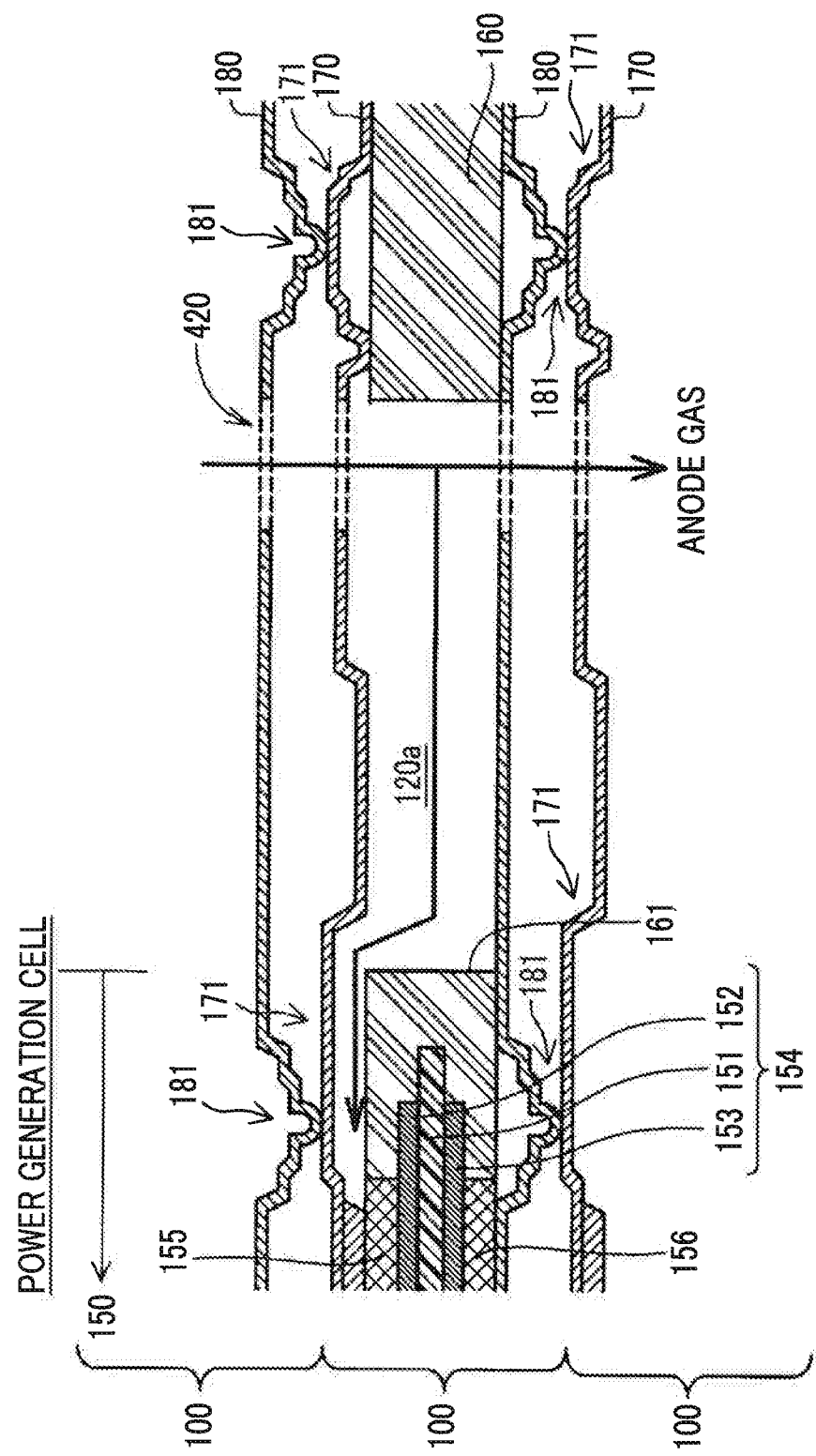
FIG. 3 is a cross-sectional view taken along the line III-III in FIG. 2, that is, a cross-sectional view taken along a power generation cell anode gas introduction channel of each power generation cell.

FIG. 3 is a cross-sectional view taken along the line in FIG. 2, that is, a cross-sectional view taken along the power generation cell anode gas introduction channel 120a of each power generation cell 100. Each power generation cell 100 includes a resin frame 160, an anode separator plate 170 and a cathode separator plate 180. The resin frame 160 is made of, for example, a resin, and retains a membrane electrode assembly 154 so as to surround the membrane electrode assembly 154. The membrane electrode assembly 154 includes an electrolyte 151, an anode catalyst layer 152 and a cathode catalyst layer 153. The electrolyte 151 is made up of an ion exchange resin membrane. The ion exchange resin membrane exhibits good proton conductivity in a wet state. More specifically, the electrolyte 151 is made up of a fluororesin-based ion exchange resin membrane having a sulfonic group as an ion exchange group, that is, the electrolyte 151 is made up of Nafion (trademark), or the like. Each of the anode catalyst layer 152 and the cathode catalyst layer 153 has carbon on which a catalyst (for example, platinum) is supported, and an ionomer having, for example, a sulfonic group ($—SO_3H$). An anode gas diffusion layer 155 is arranged on the anode catalyst layer 152. A cathode gas diffusion layer 156 is arranged on the cathode catalyst layer 153. Each of the anode gas diffusion layer 155 and the cathode gas diffusion layer 156 is formed of, for example, carbon paper or carbon nonwoven fabric. Each of the anode gas diffusion layer 155 and the cathode gas diffusion layer 156 may be formed of an expanded metal or a metal porous material, other than carbon paper or carbon nonwoven fabric.

The cathode separator plate 180 has a protrusion 181 that protrudes toward the anode separator plate 170 of the adjacent power generation cell 100. The anode separator plate 170 has a receiving portion 171 at a position at which the anode separator plate 170 faces the protrusion 181. When the protrusion 181 is pressed by the receiving portion 171, a seal is established between the adjacent power generation cells 100. An adhesive agent or a seal member (not shown) is arranged between the protrusion 181 and the receiving portion 171. Even when the adjacent cell is the dummy cell 200, a seal is established with a similar configuration.

The resin frame 160 has a groove 161 that connects to the anode gas supply manifold 420. The side of the groove 161 across from the anode gas supply manifold 420 connects to the anode side of the membrane electrode assembly 154 in the center area 150 to form the power generation cell anode gas introduction channel 120a. The other power generation cell anode gas introduction channels 120b to 120f, the power generation cell cathode gas introduction channel 110, the power generation cell cathode gas delivery channel 115 and the power generation cell anode gas delivery channel 125 are also similarly formed of the groove 161 provided in the resin frame 160.

Figure 4:
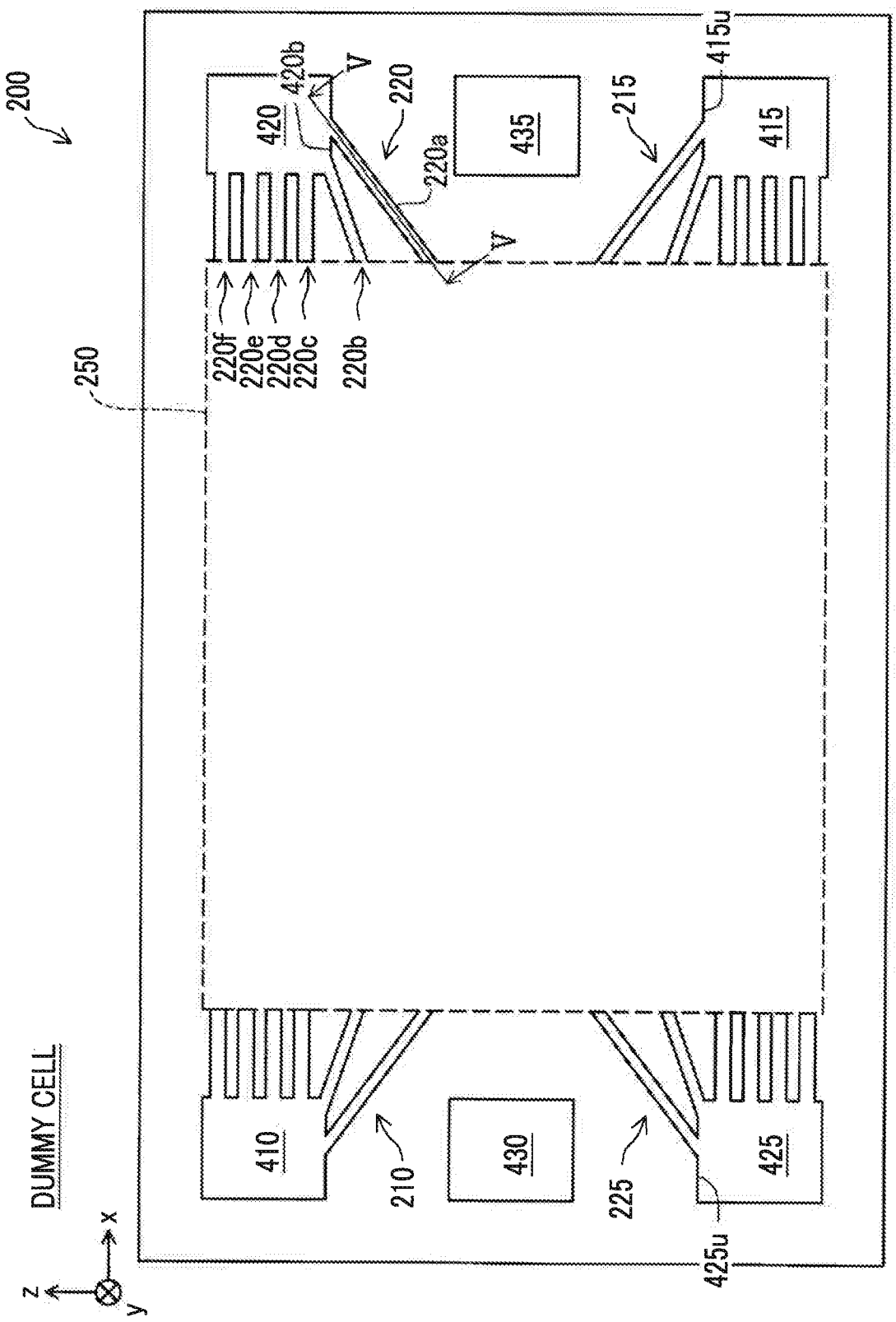
FIG. 4 is a plan view that schematically shows each dummy cell.

FIG. 4 is a plan view that schematically shows each dummy cell 200. The dummy cell 200 differs from the power generation cell 100 in that no membrane electrode assembly 154 is provided in a center area 250. The other configuration of the dummy cell 200 is similar to that of the power generation cell 100. Each dummy cell 200 includes a dummy cell cathode gas introduction channel 210, a dummy cell cathode gas delivery channel 215, a dummy cell anode gas introduction channel 220 and a dummy cell anode gas delivery channel 225. The dummy cell cathode gas introduction channel 210 is used to introduce cathode gas from the cathode gas supply manifold 410 to the center area 250. The dummy cell cathode gas delivery channel 215 is used to deliver cathode gas from the center area 250 to the cathode gas discharge manifold 415. The dummy cell anode gas introduction channel 220 is used to introduce anode gas from the anode gas supply manifold 420 to the center area 250. The dummy cell anode gas delivery channel 225 is used to deliver anode gas from the center area 250 to the anode gas discharge manifold 425.

The dummy cell anode gas introduction channel 220 includes a plurality of dummy cell anode gas introduction channels 220a to 220f arranged along the direction of gravitational force. At least one of the dummy cell anode gas introduction channels 220a to 220f, that is, the dummy cell anode gas introduction channel 20a in FIG. 4, is provided so as to connect to a bottom face 420b at the lower side of the anode gas supply manifold 420 in the direction of gravitational force. The dummy cell cathode gas introduction channel 210 also has a similar configuration. The dummy cell anode gas delivery channel 225 also has a plurality of delivery channels. At least one of those delivery channels is provided so as to connect to an upper face 415u of the manifold 415 in the direction of gravitational force. The dummy cell cathode gas delivery channel 215 also has a plurality of delivery channels. At least one of those delivery channels is provided so as to connect to an upper face 425u of the manifold 425 in the direction of gravitational force.

Figure 5:
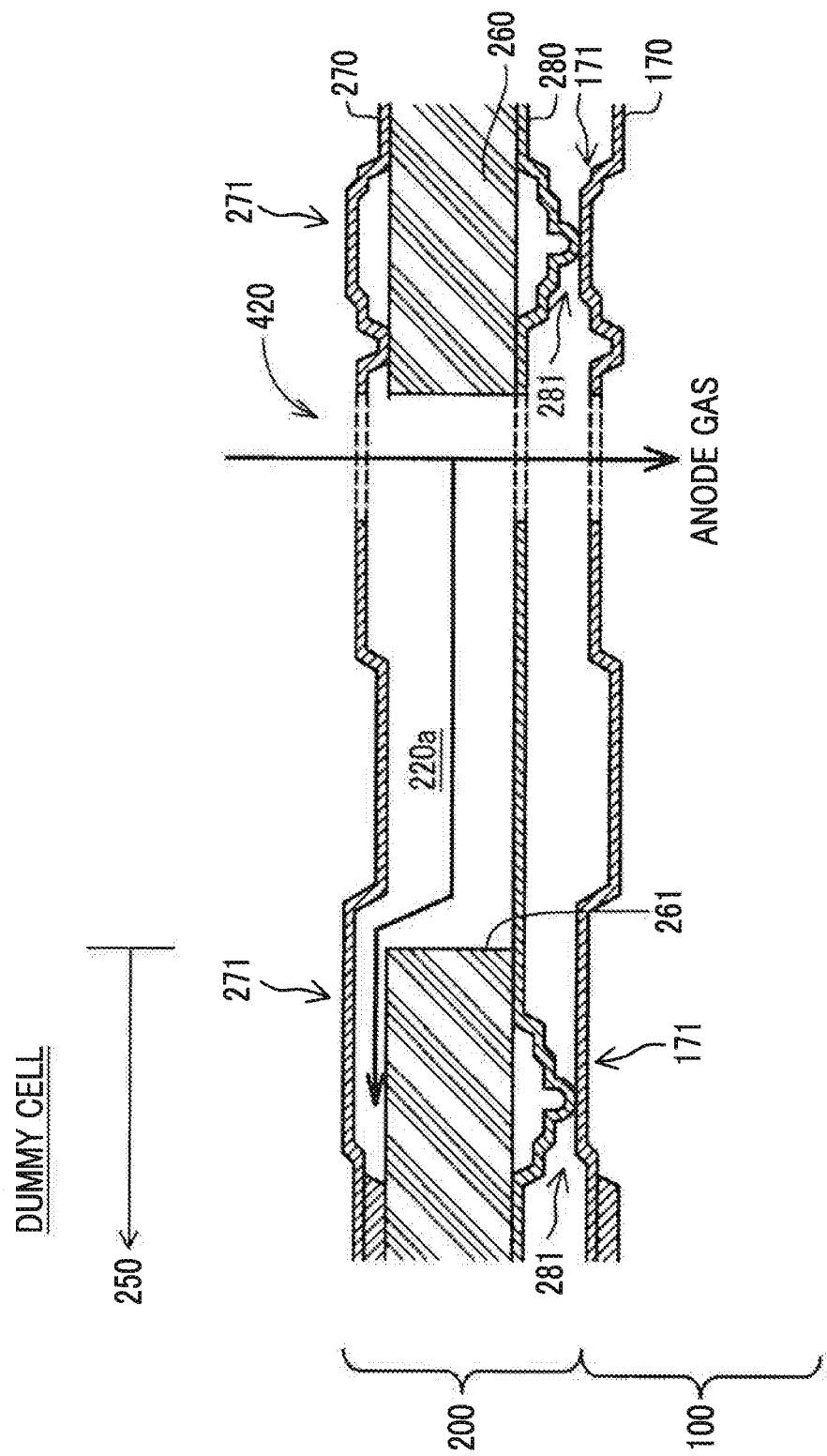
FIG. 5 is a cross-sectional view taken along the line V-V in FIG. 4, that is, a cross-sectional view taken along a dummy cell anode gas introduction channel of each dummy cell.

FIG. 5 is a cross-sectional view taken along the line V-V in FIG. 4, that is, a cross-sectional view taken along the dummy cell anode gas introduction channel 220a of each dummy cell 200. FIG. 5 differs from FIG. 3 in that each dummy cell 200 does not include the membrane electrode assembly 154 in the resin frame 260 and also does not include the anode gas diffusion layer 155 and the cathode gas diffusion layer 156. The other configuration is the same. Therefore, the shape of the anode separator plate 270 of each dummy cell 200 is the same as the shape of the anode separator plate 170 of each power generation cell 100, and the shape of the cathode separator plate 280 of each dummy cell 200 is the same as the shape of the cathode separator plate 180 of each power generation cell 100. Reference numerals obtained by adding 100 to the reference numerals of the components of each power generation cell 100 denote the components of each dummy cell 200. The current collector 300 is arranged on the side of the dummy cell 200 across from the power generation cell 100 (upper side in FIG. 5); however, the current collector 300 is not shown in FIG. 5.

As liquid water enters the anode gas supply manifold 420, the liquid water flows along the bottom face 420b (FIG. 4) at the lower side of the anode gas supply manifold 420 in the direction of gravitational force. Since the dummy cell anode gas introduction channel 220a is provided so as to connect to the bottom face 420b of the anode gas supply manifold 420 of each dummy cell 200, the liquid water flows through the dummy cell anode gas introduction channel 220a to the center area 250 of the dummy cell 200 under gravitational force. Therefore, it is possible to reduce the amount of movement of liquid water to the center area 150 of the power generation cell 100 adjacent to the dummy cell 200.

According to the first embodiment, the dummy cell 200 is provided on at least one of both ends of the plurality of power generation cells 100. At least one of the plurality of dummy cell anode gas introduction channels 220a to 220f (dummy cell anode gas introduction channel 220a) is provided so as to connect to the bottom face 420b at the lower side of the anode gas supply manifold 420 in the direction of gravitational force. As a result, liquid water is easy to move to the center area 250 of the dummy cell 200, the amount of movement of liquid water to the power generation area 150 of the power generation cell 100 adjacent to the dummy cell 200 reduces, so it is possible to suppress intensive entry of liquid water to the specific power generation cell 100.

Second Embodiment

Figure 6:
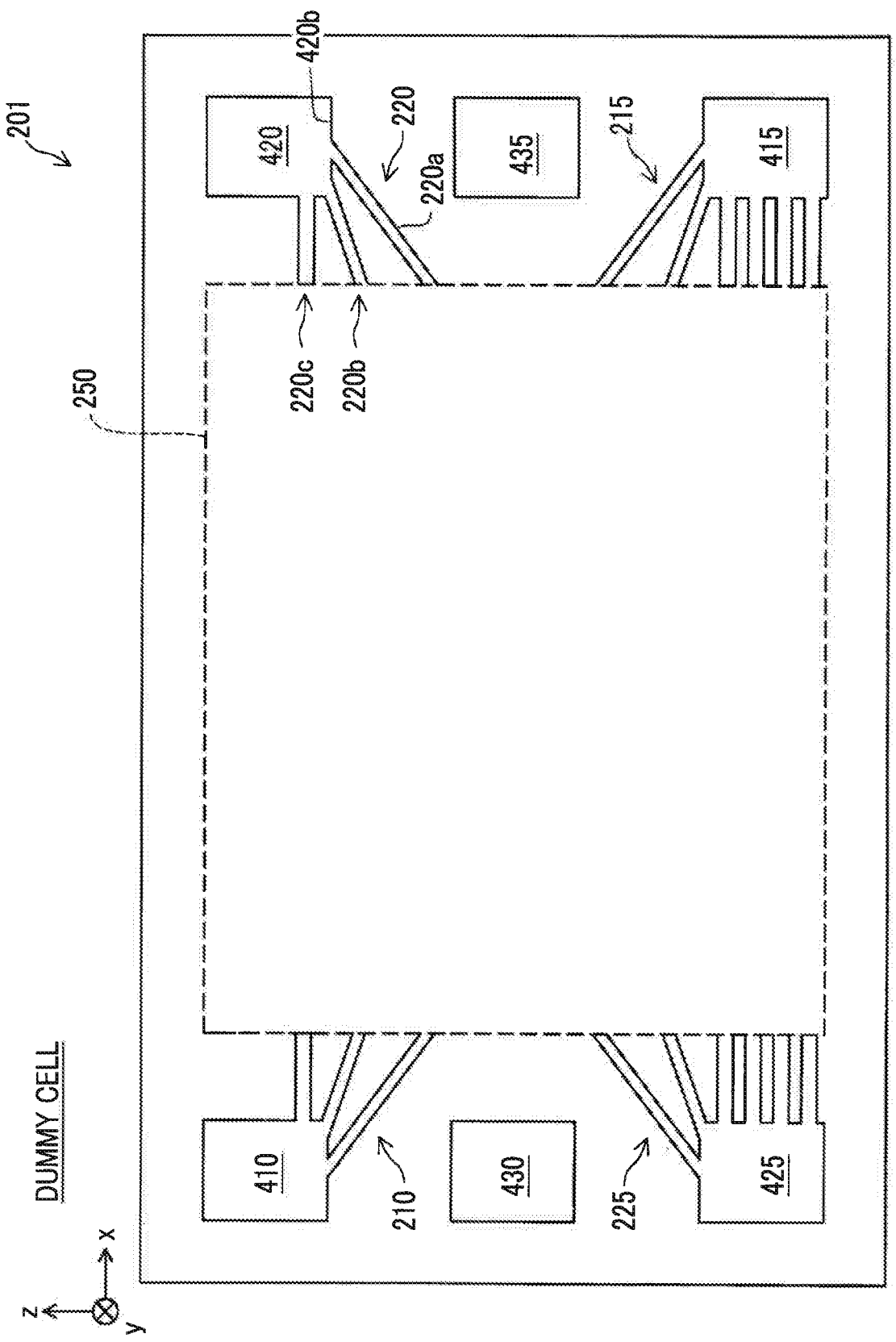
FIG. 6 is a plan view that schematically shows a dummy cell according to a second embodiment.

FIG. 6 is a plan view that schematically shows a dummy cell 201 according to a second embodiment. The second embodiment differs from the first embodiment in that the dummy cell 201 according to the second embodiment does not include the three dummy cell anode gas introduction channels 220d to 220f from the top in the direction of gravitational force among the dummy cell anode gas introduction channels 220a to 220f according to the first embodiment shown in FIG. 4. The other configuration is the same.

In the second embodiment, since the dummy cell 201 does not include the three dummy cell anode gas introduction channels 220d to 220f from the top in the direction of gravitational force, where anode gas is easier to move, among the dummy cell anode gas introduction channels 220a to 220f, the route of movement of anode gas and liquid water is only through the dummy cell anode gas introduction channels 220a to 220c. As a result, it is possible to reduce the amount of movement of anode gas to the center area 250 of the dummy cell 201. Anode gas that has moved to the center area 250 of the dummy cell 201 does not contribute to power generation. Therefore, in the second embodiment, the amount of anode gas that does not contribute to power generation is reduced, so it is possible to reduce waste of anode gas.

Third Embodiment

Figure 7:
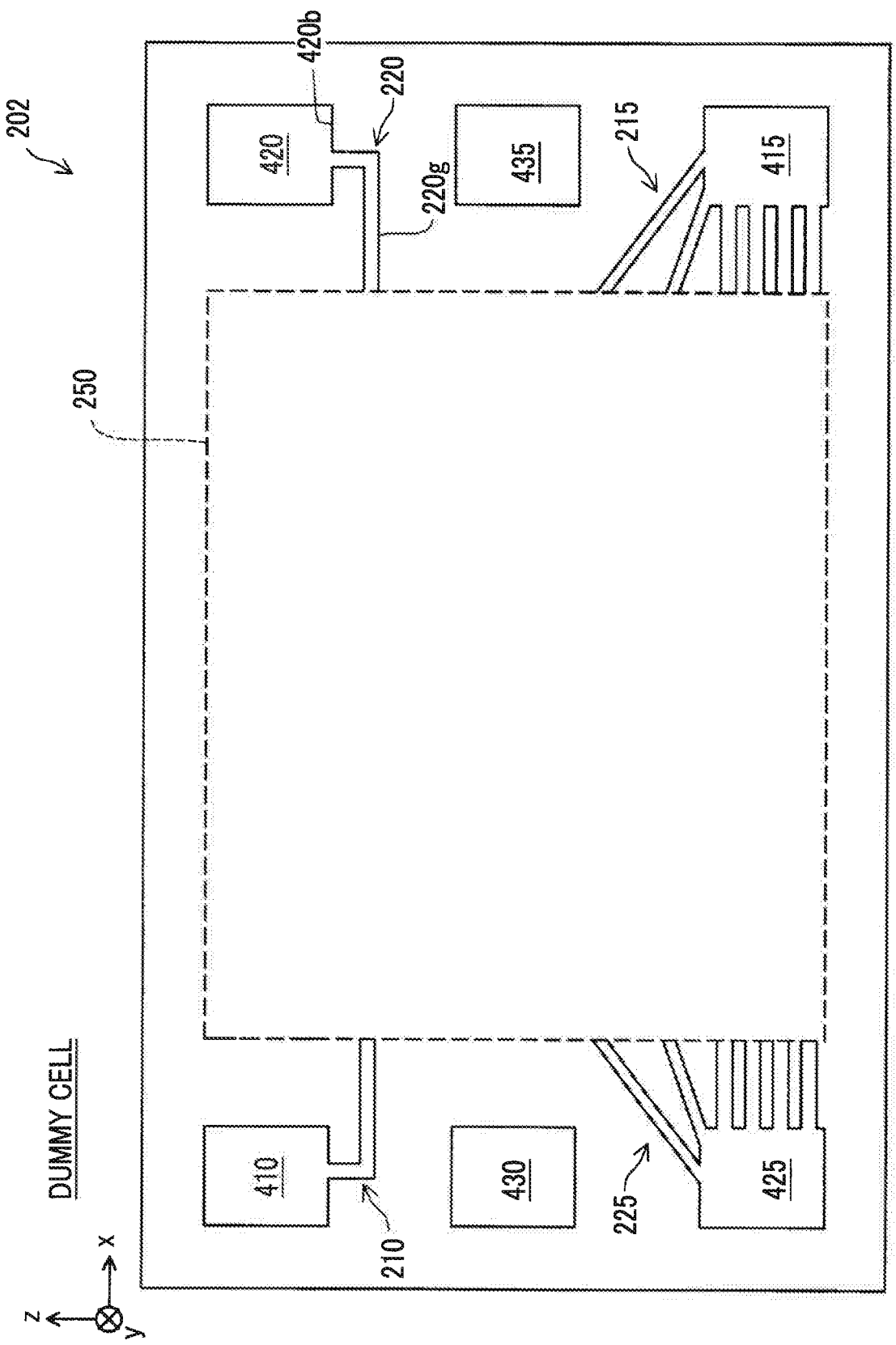
FIG. 7 is a plan view that schematically shows a dummy cell according to a third embodiment.

FIG. 7 is a plan view that schematically shows a dummy cell 202 according to a third embodiment. The third embodiment differs from the first embodiment in that the dummy cell 202 includes only one dummy cell anode gas introduction channel 220g provided so as to connect to the bottom face 420b at the lower side of the anode gas supply manifold 420 in the direction of gravitational force as the anode gas introduction channel 220. The dummy cell anode gas introduction channel 220g is bent in the example shown in FIG. 7; however, the dummy cell anode gas introduction channel 220g may be formed in a straight shape like the dummy cell anode gas introduction channel 220a shown in FIG. 4 in the first embodiment or the dummy cell anode gas introduction channel 220a shown in FIG. 6 in the second embodiment.

As liquid water enters the anode gas supply manifold 420, the liquid water flows along the bottom face 420b at the lower side of the anode gas supply manifold 420 in the direction of gravitational force. According to the third embodiment, as liquid water enters the anode gas supply manifold 420, the liquid water closes the anode gas supply manifold 420-side inlet of the only one dummy cell anode gas introduction channel 220g that reaches the center area 250 of the dummy cell 200. As the pressure in the anode gas supply manifold 420 increases, a pressure difference between the outlet and inlet of the dummy cell anode gas introduction channel 220g increases, so liquid water is easy to move to the center area 250 of the dummy cell 200. Since liquid water is easier to move to the center area 250 of the dummy cell 200 as compared to the first embodiment or the second embodiment, the amount of movement of liquid water to the power generation area 150 of the power generation cell 100 adjacent to the dummy cell 200 further reduces, so it is possible to suppress intensive movement of liquid water to the specific power generation cell 100. Since the total channel cross-sectional area of the dummy cell anode gas introduction channel 220 is further reduced, anode gas is difficult to enter the center area 250 of the dummy cell 200, so it is possible to further reduce waste of anode gas.

The first to third embodiments are described by taking the dummy cell anode gas introduction channel 220 as an example. Instead, a similar configuration may also be employed for the dummy cell cathode gas introduction channel 210.

A similar configuration may also be employed for the dummy cell cathode gas introduction channel 210 in addition to the above-described first to third embodiments. For this reason, in summary, the dummy cell 200 is provided on at least one of both ends of the plurality of power generation cells 100. The dummy cell 200 includes one or more dummy cell reaction gas introduction channels (a plurality of dummy cell reaction gas introduction channels in the first and second embodiments, and one dummy cell reaction gas introduction channel in the third embodiment) as a reaction gas introduction channel for introducing reaction gas from the reaction gas supply manifold to the center area 250 of the dummy cell 200. At least one of the dummy cell reaction gas introduction channels is provided so as to connect to the bottom face at the lower side of the reaction gas supply manifold in the direction of gravitational force. As a result, liquid water is easy to move to the center area 250 of the dummy cell 200. Accordingly, the amount of movement of liquid water to the center area 150 of the power generation cell 100 reduces, so it is possible to suppress intensive entry of liquid water to the specific power generation cell 100, particularly, the center area 150 of the power generation cell 100 adjacent to the dummy cell 200.

Fourth Embodiment

Figure 8:
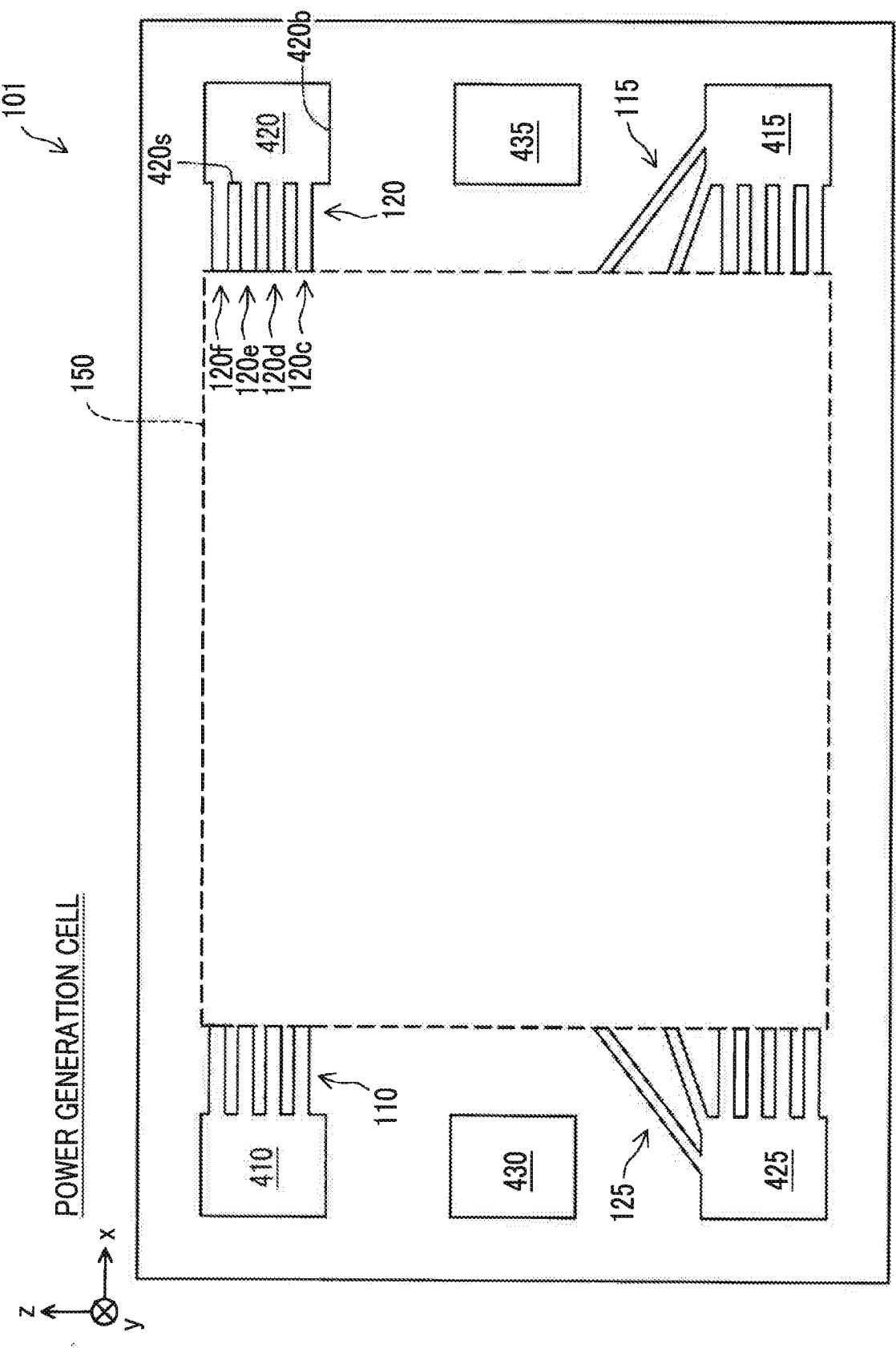
FIG. 8 is a plan view that schematically shows each power generation cell according to a fourth embodiment.

FIG. 8 is a plan view that schematically shows each power generation cell 101 according to a fourth embodiment. The fourth embodiment differs from the first to third embodiments in the power generation cell anode gas introduction channel 120. Specifically, the fourth embodiment differs from the first to third embodiments in that the power generation cell anode gas introduction channels 120a, 120b provided at the lower side in the direction of gravitational force, including the power generation cell anode gas introduction channel 120a provided so as to connect to the bottom face 420b of the anode gas supply manifold 420, among the power generation cell anode gas introduction channels 120a to 120f shown in FIG. 2 are not provided and the power generation cell anode gas introduction channels 120c to 120f are provided so as to connect to a side face 420s above the bottom face 420b of the anode gas supply manifold 420 in the direction of gravitational force. The other configuration is the same.

In the fourth embodiment, no power generation cell anode gas introduction channel is provided so as to connect to the bottom face 420b of the anode gas supply manifold 420, and the power generation cell anode gas introduction channels 120c to 120f are provided so as to connect to the side face 420s of the anode gas supply manifold 420. Since liquid water moves along the bottom face 420b of the anode gas supply manifold 420, the liquid water does not reach the inlets of the power generation cell anode gas introduction channels 120c to 120f, so liquid water is difficult to move to the power generation area 150 of the power generation cell 100. As a result, the amount of movement of liquid water to the power generation area 150 of the power generation cell 100 described in the first embodiment is further reduced, so it is possible to suppress intensive movement of liquid water to the specific power generation cell 100. The amount of liquid water flowing through the anode gas supply manifold 420 reduces toward the downstream side of reaction gas. Therefore, one or more power generation cells 100 adjacent to the dummy cell 200 just need to have the configuration according to the fourth embodiment. The configuration of the fourth embodiment is also applicable to the power generation cell cathode gas introduction channel 110.

First Alternative Embodiment

FIG. 9 is a cross-sectional view taken along the dummy cell anode gas introduction channel 220a of each dummy cell 200 according to a first alternative embodiment. The first alternative embodiment differs from the first to fourth embodiments in that the dummy cell anode gas introduction channel 220 is formed of the groove 261 provided in the resin frame 260 in the first to fourth embodiments and the dummy cell anode gas introduction channel is formed of an anode gas introduction channel forming portion 273 provided in the anode separator plate 270 in the alternative embodiment. Although not shown in the drawing, the dummy cell cathode gas introduction channel 210 is formed of a cathode gas introduction channel forming portion provided in the cathode separator plate 280. The same applies to the dummy cell cathode gas delivery channel 215 and the dummy cell anode gas delivery channel 225. The same applies to the power generation cell 100. In this way, the reaction gas introduction channels and the reaction gas delivery channels may be formed by using not the groove 261 of the resin frame 260 or the groove 161 of the resin frame 160 but the separator plate. However, as in the case of the first to fourth embodiments, when the reaction gas introduction channels and the reaction gas delivery channels are formed by using the groove 261 of the resin frame 260 or the groove 161 of the resin frame 160, the separator plates 170, 180 of each power generation cell 100 and the separator plates 270, 280 of the dummy cell 200 may have the same configuration, and do not need to be prepared separately. As a result, a die for the anode separator plate 170 and a die for the anode separate plate 270 are shared, and a die for the cathode separator plate 180 and a die for the cathode separator plate 280 are shared, so it is advantageous in reducing manufacturing cost.

Second Alternative Embodiment

In the above-described first to fourth embodiments, the groove 261 is provided in the resin frame 260 to form the reaction gas introduction channels and the reaction gas delivery channels. The resin frame may be molded by injection molding or may be formed by using a base material and an adhesion sheet bonded to each face of the base material.

The disclosure is not limited to the above-described embodiments or alternative embodiments. The disclosure may be implemented in various forms without departing from the scope of the disclosure. For example, the technical characteristics in the embodiments and alternative embodiments, corresponding to the technical characteristics in the aspects described in SUMMARY, may be replaced or combined as needed in order to solve part or all of the above-described inconvenience or in order to achieve part or all of the above-described advantageous effects. Unless the technical characteristics are described as indispensable ones in the specification, the technical characteristics may be omitted as needed,

What is claimed is:

1. A fuel cell stack comprising:
a plurality of power generation cells stacked on top of each other;
a dummy cell provided on at least one of both ends of the plurality of power generation cells, the dummy cell being configured not to generate electric power; and
a reaction gas supply manifold extending through the plurality of power generation cells and the dummy cell, wherein
the dummy cell includes one or more dummy cell reaction gas introduction channels as a reaction gas introduction channel that introduces reaction gas from the reaction gas supply manifold to a center area of the dummy cell,
at least one of the dummy cell reaction gas introduction channels is provided so as to connect to a bottom face of the reaction gas supply manifold in a direction of gravitational force, and
at least one of the dummy cell reaction gas introduction channels is provided so as to connect to a side face of the reaction gas supply manifold.

2. The fuel cell stack according to claim 1, wherein the number of the dummy cell reaction gas introduction channels provided so as to connect to the bottom face of the reaction gas supply manifold in the direction of gravitational force is one.

3. The fuel cell stack according to claim 1, wherein
each power generation cell includes one or more power generation cell reaction gas introduction channels as a reaction gas introduction channel that introduces reaction gas from the reaction gas supply manifold to a power generation area of the power generation cell, and
in each of one or more of the power generation cells adjacent to the dummy cell, the power generation cell reaction gas introduction channel is not provided so as to connect to the bottom face of the reaction gas supply manifold in the direction of gravitational force but provided so as to connect to a side face above the bottom face in the direction of gravitational force.

4. The fuel cell stack according to claim 3, wherein
the dummy cell includes a first resin frame, a first anode separator plate and a first cathode separator plate, the first resin frame surrounds the center area of the dummy cell, and the first anode separator plate and the first cathode separator plate sandwich the first resin frame,
each power generation cell includes a second resin frame, a second anode separator plate and a second cathode separator plate, the second resin frame surrounds the power generation area of the power generation cell, and the second anode separator plate and the second cathode separator plate sandwich the second resin frame,
a shape of each of the first anode separator plate and the first cathode separator plate is the same as a shape of each of the second anode separator plate and the second cathode separator plate, and
the dummy cell reaction gas introduction channel is provided with a groove of the first resin frame, and the power generation cell reaction gas introduction channel is provided with a groove of the second resin frame.

5. The fuel cell stack according to claim 3, wherein
the dummy cell includes a first resin frame, a first anode separator plate and a first cathode separator plate, the first resin frame surrounds the center area of the dummy cell, and the first anode separator plate and the first cathode separator plate sandwich the first resin frame,
each power generation cell includes a second resin frame, a second anode separator plate and a second cathode separator plate, the second resin frame surrounds the power generation area of the power generation cell, and the second anode separator plate and the second cathode separator plate sandwich the second resin frame, and
the dummy cell reaction gas introduction channel is provided with an anode gas introduction channel forming portion of the first anode separator plate and a cathode gas introduction channel forming portion of the first cathode separator plate, and
the power generation cell reaction gas introduction channel is provided with an anode gas introduction channel forming portion of the second anode separator plate and a cathode gas introduction channel forming portion of the second cathode separator plate.

6. A dummy cell provided on at least one of both ends of a plurality of stacked power generation cells of a fuel cell stack, the dummy cell being configured not to generate electric power, the dummy cell comprising:

one or ore dummy cell reaction gas introduction channels serving as a reaction gas introduction channel that introduces reaction gas from a reaction gas supply manifold to a center area of the dummy cell, the reaction gas supply manifold extending through the plurality of power generation cells and the dummy cell, wherein at least one of the dummy cell reaction gas introduction channels is provided so as to connect to a bottom face of the reaction gas supply manifold in a direction of gravitational force, and at least one of the dummy cell reaction gas introduction channels is provided so as to connect to a side face of the reaction gas supply manifold.

\* \* \* \* \*